United States Patent
Kim et al.

(10) Patent No.: US 9,095,905 B2
(45) Date of Patent: Aug. 4, 2015

(54) METHOD OF MANUFACTURING CONTROL FINGER USING METAL POWDER INJECTION MOLDING

(71) Applicant: Hyundai Motor Company, Seoul (KR)

(72) Inventors: Ki Jung Kim, Gyeonggi-do (KR); Jong Moon Kim, Gyeonggi-do (KR); Sung Yong Cho, Seoul (KR); Jong Yop Kim, Seoul (KR); Ki Bum Kim, Seoul (KR); Hang Cheol Cho, Gyeonggi-do (KR); Hyun Duk Chang, Seoul (KR); Seong Jun Jeon, Daegu (KR)

(73) Assignee: Hyundai Motor Company, Seoul (KR)

( * ) Notice: Subject to any disclaimer, the term of this patent is extended or adjusted under 35 U.S.C. 154(b) by 301 days.

(21) Appl. No.: 13/706,692

(22) Filed: Dec. 6, 2012

(65) Prior Publication Data
US 2014/0105778 A1    Apr. 17, 2014

(30) Foreign Application Priority Data
Oct. 15, 2012    (KR) .......................... 10-2012-0113936

(51) Int. Cl.
| | |
|---|---|
| *B22F 5/10* | (2006.01) |
| *F16H 61/00* | (2006.01) |
| *B22F 3/24* | (2006.01) |
| *B22F 3/10* | (2006.01) |
| *B22F 3/22* | (2006.01) |
| *C22C 33/02* | (2006.01) |

(52) U.S. Cl.
CPC ................ *B22F 3/24* (2013.01); *B22F 3/1025* (2013.01); *B22F 3/225* (2013.01); *C22C 33/0264* (2013.01); *F16H 61/00* (2013.01); *B22F 5/10* (2013.01)

(58) Field of Classification Search
CPC ............ B23P 11/00; F24J 2/04; F24J 2/1057; F24J 2/24; F24J 2/242; F24J 2/5267; F24J 2002/5281; F24J 2002/5284; F24J 2002/5451; Y02E 10/47
USPC ........................ 29/890.033; 62/235.1; 165/59
See application file for complete search history.

(56) References Cited

U.S. PATENT DOCUMENTS

| | | | |
|---|---|---|---|
| 5,147,601 A * | 9/1992 | Ohtsuka et al. .................. 419/25 |
| 2005/0163645 A1 * | 7/2005 | Xu et al. .......................... 419/28 |
| 2005/0274222 A1 | 12/2005 | Hwang et al. |
| 2007/0246131 A1 * | 10/2007 | Watanabe ...................... 148/403 |
| 2009/0129961 A1 * | 5/2009 | Lavoie et al. .................... 419/10 |
| 2009/0297396 A1 * | 12/2009 | Lee et al. ....................... 420/582 |
| 2010/0032859 A1 * | 2/2010 | Ryou et al. .................... 264/154 |
| 2010/0183471 A1 * | 7/2010 | Liu et al. ......................... 419/37 |
| 2011/0123384 A1 * | 5/2011 | Park ............................... 419/18 |

(Continued)

FOREIGN PATENT DOCUMENTS

| | | |
|---|---|---|
| JP | 04329847 A | 11/1992 |
| JP | 05070881 A | 3/1993 |

*Primary Examiner* — Alexander P Taousakis
(74) *Attorney, Agent, or Firm* — Mintz Levin Cohn Ferris Glovsky and Popeo, P.C.; Peter F. Corless

(57) ABSTRACT

Disclosed is a method of manufacturing a control finger using metal powder injection molding. In particular, a metal power and a binder are mixed to obtain a base material for injection molding. Then a molded body is formed by injecting the base material into a mold in a shape of the control finger, using a nozzle. The molded body is then degreased and sintered to form a sintered body from the degreased body. Post-processing is then performed on the sintered body.

9 Claims, 2 Drawing Sheets

(56) References Cited

U.S. PATENT DOCUMENTS

| | | | |
|---|---|---|---|
| 2012/0015204 A1* | 1/2012 | McCabe et al. | 428/546 |
| 2012/0073303 A1* | 3/2012 | McCarren et al. | 60/752 |
| 2012/0167716 A1* | 7/2012 | Matheson | 75/308 |
| 2012/0251377 A1* | 10/2012 | Hwang et al. | 419/14 |
| 2013/0156626 A1* | 6/2013 | Roth-Fagaraseanu et al. | 419/6 |
| 2013/0315774 A1* | 11/2013 | Cheng et al. | 419/28 |
| 2014/0227124 A1* | 8/2014 | Lee et al. | 419/36 |

\* cited by examiner

METHOD OF MANUFACTURING CONTROL FINGER USING METAL POWDER INJECTION MOLDING

CROSS-REFERENCE TO RELATED APPLICATIONS

This application claims priority under 35 U.S.C. §119 to Korean Patent Application No. 10-2012-0113936, filed on Oct. 15, 2012, in the Korean Intellectual Property Office, the disclosure of which is incorporated herein by reference in its entirety.

BACKGROUND

1. Field of the Invention

The present invention relates to a method of manufacturing a control finger using metal powder injection molding, and more particularly, to a method of manufacturing a control finger using metal powder injection molding which replaces a casting method in the conventional art with a metal powder injection molding method which is excellent in dimensional accuracy, thereby reducing costs, and improves physical properties by adjusting powder compositions and detailed process conditions.

2. Description of the Related Art

In general, a manual transmission is an apparatus that is installed between a clutch and a propulsion shaft so as to appropriately change a driving power of an engine in accordance with a driving state variation of vehicles, and includes a transmission manipulation mechanism so that the transmission is operated by the driver's manipulation.

FIG. 1 is a perspective view of a control finger mounted on a manual transmission. As shown, the manual transmission commonly includes a control mechanism for changing gears and a synchromesh mechanism which is interlocked with the control mechanism, and a control finger 200 is installed to operate a shift rug connected to the synchromesh mechanism. The control finger 200 should be precisely formed and durable (such as strength, wear resistance or the like), because the control finger 200 is consistently used in a rough environment over a long period of time.

Conventionally, the control finger 200 is manufactured by a casting method using nodular graphite cast iron (e.g., Korean Standard FCD450, FCD500, and FCD600). However, multiple additional processes for forming a final shape are required after casting because of the elaborate shape of the control finger 200.

Namely, when the control finger 200 is manufactured by the casting method, dimensional accuracy is deteriorated. Therefore, there is a problem in that product costs are increased due to post-processing which incurs additional process costs and results in additional loss of materials.

SUMMARY

The present invention has been made in an effort to provide a method of manufacturing a control finger using metal powder injection molding having advantages of having increased economic efficiency by improving the dimensional accuracy by using a metal powder injection molding method instead of a conventional casting method, and being applicable to even a severe or rough environment such as a manual transmission or the like by adjusting optimal powder compositions and process conditions.

An exemplary embodiment of the present invention provides a method of manufacturing a control finger using metal powder injection molding, including: mixing a metal power and a binder to obtain a base material for injection molding; forming a molded body by injecting the obtained base material for injection molding into a mold in a shape of the control finger, using a nozzle; degreasing the molded body; sintering the degreased molded body to form a sintered body; and post-processing the sintered body.

More specifically, about 85 to 90 wt % of the metal powder and about 10 to 15 wt % of the binder may be mixed to obtain the base material for injection molding, wherein the binder may be paraffin wax. The metal powder may include about 0.4 to 0.6 wt % of carbon (C), about 1.5 to 2.5 wt % of nickel (Ni) and the remaining weight percent of iron. Furthermore, forming the molded body may include using the nozzle in a temperature range of about 100 to 200° C.

Furthermore, degreasing of the molded body may be performed by extracting solvent in a temperature range from about 35° C. to 50° C., using normal hexane solvent, and by performing a thermal decomposition in a temperature range from about 100° C. to 150° C. Additionally, forming of the sintered body may be performed by heating in a temperature range from about 1250° C. to 1350° C.

Advantageously, method according to the present invention having the above-mentioned configuration reduces the corresponding cost of manufacturing by replacing a conventional casting method with a metal powder injection molding method which is excellent in dimensional accuracy, and reducing a process cost and a loss of materials due to post-processing. In addition, the method according to the present invention can secure applicable physical properties even for server and rough environments by adjusting metal powder compositions and detailed process conditions to improve durability such as strength, fatigue life or the like.

DETAILED DESCRIPTION

Figure 1:
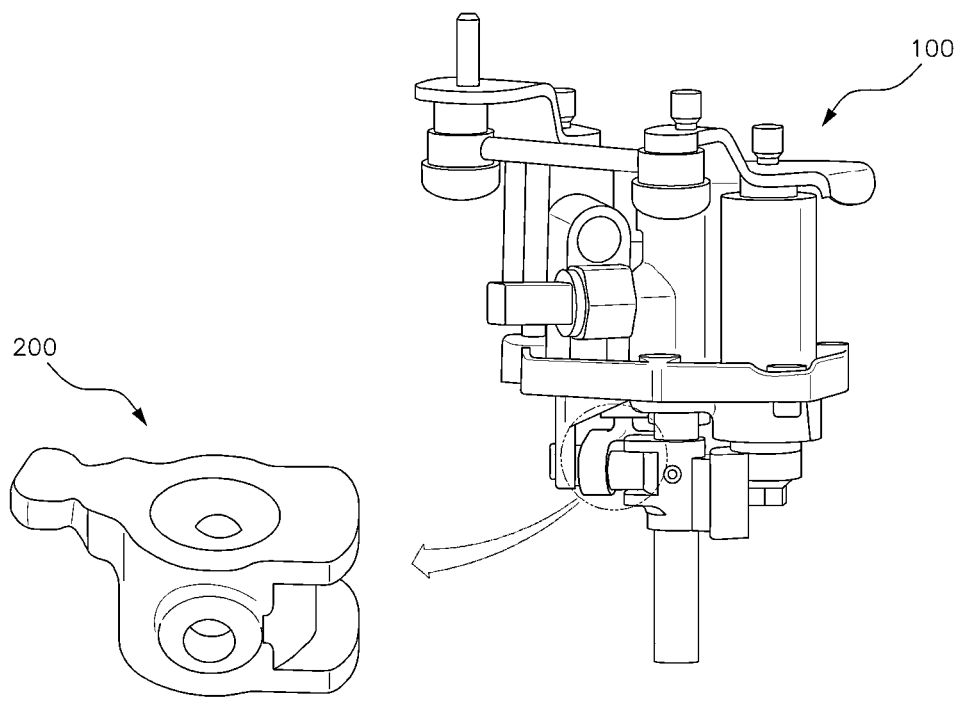
FIG. 1 is a perspective view of a control finger mounted on a manual transmission.

It should be understood that the terms used in the specification and the appended claims should not be construed as limited to general and dictionary meanings, but interpreted based on the meanings and concepts corresponding to technical spirit of the present invention on the basis of the principle that the inventor is allowed to define terms appropriately for the best explanation of the inventor's own invention. Therefore, the configuration described in the description and illustrated in drawings proposed herein is just a preferable example of the present invention for the purpose of illustration only, not intended to limit the scope of the invention, so it should be understood that other equivalents and modifications which can be replaced at the time of filing of the present invention could be made thereto without departing from the spirit and scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings.

Although the control finger manufactured via a casting method in the conventional art somewhat satisfies the physical property requirements for a manual transmission operating environment, those properties are not necessarily dimensionally accurate, and thus multiple post-processing procedures are required. Therefore, there is a problem in that a cost of the control finger is increased due to post-processing which incur increased processing costs and result in loss of materials.

Therefore, the present invention relates to a manufacturing method for replacing the existing casting method for the control finger with a metal powder injection molding method which provides improved dimensional accuracy.

The metal powder injection molding (MIM) is a new powder metallurgy forming technology which adapts a powder metallurgy technology to an injection molding method, which is a mass production technology of forming precise plastic components. In general, the metal powder injection molding method includes mixing a fine metal powder and a binder as a main agent for fluidity, injection molding the mixture into a mold, removing the binder from the injection molded body, and finally sintering the powder at a high temperature to manufacture metal components.

In general, metal powder injection molding provides increased dimensional accuracy in comparison to the casting method, but physical properties of the resulting product are low. Therefore, post-processing is required to improve the physical properties via a surface heat treatment or the like. In addition, when utilizing the conventional casting method, it is difficult to obtain the desired physical properties because it is difficult to control carbon within the materials, and therefore, the casting method is inadequate as a method for manufacturing components which are operated in severe or rough environments such as a manual transmission or the like.

Therefore, an object of the present invention is to solve the above-mentioned problems and secure improved dimensional accuracy so that the resulting product has a shape nearly identical to the shape of the finally completed product by adjusting alloy compositions and manufacturing process conditions in a metal powder injection molding method, to reduce the amount of post-processing and the loss of materials, thereby implementing a cost reduction.

Figure 2:
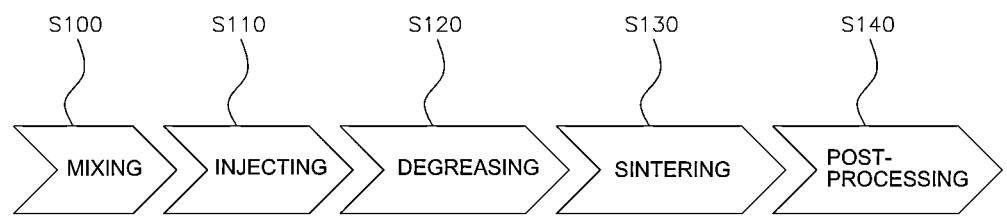
FIG. 2 is a flow chart illustrating a method of manufacturing a control finger using a metal powder injection molding according to an exemplary embodiment of the present invention.

FIG. 2 is a flow chart illustrating a method of manufacturing a control finger using a metal powder injection molding according to the present invention. Hereinafter, the detailed description is provided in order of steps.

1. Mixing Step (S100)

First, in order to obtain base materials for injection molding, a metal powder and a binder are mixed. The binder is added in order to maintain fluidity of the metal powder and a shape of the metal powder at the time of injection molding. As the binder, a common organic binder may be used. The binder may include a bonding agent or a lubricant such as polyethylene, paraffin wax, and/or stearic acid. More specifically, about 85 to 90 wt % of the metal powder and about 10 to 15 wt % of the binder are mixed together. Preferably, the paraffin wax is used as the binder.

The weight ratio is provided for a homogeneous mixture of the metal powder and the binder. If the metal powder contained therein is less than about 85 wt %, the fluidity for injection is high, while a long period of time is required for degreasing. In addition, if the metal powder contained therein is more than 90 wt %, the molded body does not have a sufficient amount of strength when the injection is performed. Accordingly, it is preferable that the metal powder and the binder are mixed at the above-mentioned weight ratio.

In addition, the metal powder is preferably made by mixing individually provided metallic elements preferably including about 0.4 to 0.6 wt % of carbon (C), about 1.5 to 2.5 wt % of nickel (Ni), less than about 1 wt % of other alloying elements, and the remaining weight percent of iron.

Specifically, the carbon (C) is added to increase strength and hardness of the material, and in order for the fine alloying elements to be precipitated as carbides. It is preferable that the content of the carbon is about 0.4 wt % or more in order to obtain desired mechanical strength. Further, it is preferable that the content of the carbon is about 0.6 wt % or less to reduce an impact value which results in brittleness.

In addition, the nickel may be added to improve mechanical properties and qualities of quenching when a heat treatment is performed. It is preferable that the content of the nickel is about 1.5 wt % or more in order to obtain a desired mechanical strength and quenching qualities. Further, it is preferable that the content of the nickel is about 2.5 wt % or less when considering the cost of nickel in relation to its effect.

2. Injecting Step (S110)

The obtained base materials for injection molding are injected into a mold formed in a shape of the control finger via a nozzle, and therefore a molded body is formed in a shape which is substantially close to the shape of the finally completed product (Implementation of Near-Net Shape). The temperature of the nozzle may be set by considering fluidity of the base materials for injection molding and vaporization of the binder. Therefore, it is preferable that the temperature of the nozzle be within the range of about 100 to 200° C. so that internal gas pockets in the molded body are fully removed.

3. Degreasing Step (S120)

Because the molded body contains the binder, a degreasing process is performed in order to remove the binder. The most general method of removing the binder is done by slowly heating the molded body to vaporize the binder through thermal decomposition.

However, when the binder is heated and evaporated, because most of the binders slowly evaporate at low temperatures and rapidly evaporate upon reaching a certain high temperature, a deformation of the molded body, such as bending or twisting, may occur. Therefore, it is necessary to minimize the deformation of the molded body step by step when carrying out solvent extraction and thermal decomposition in the degreasing step.

Specifically, the binder in the molded body may be removed by immersing the molded body in normal hexane (n-hexane) solvent and by extracting the solvent in a preferable temperature range from about 35° C. to 50° C.

If the temperature is higher than about 50° C., because a reaction speed for removing the binder is so high that the binder is removed before an appropriate extraction path is formed in the molded body, a crack is created due to stress concentration in the molded body. If the temperature is lower than about 35° C., the crack cannot be created, but it takes a long time to remove the binder, and this causes an increase of process costs. Therefore, it is preferable that the temperature is in the above-mentioned range.

Next, in order to remove a high melting point binder, which remains in the molded body, thermal decomposition is performed. In this case, by heating to within a temperature range from about 100° C. to 150° C., the binder is fully removed before sintering.

As described above, the binder is rapidly removed by continuously carrying out solvent extraction and degreasing by the thermal decomposition. Thereby, process costs can be reduced as an overall processing time is shortened, and stability in a sintering process can be secured.

4. Sintering Step (S130)

A vacuum may be provided by a pump, after generating an ambient pressure environment via gas by preferably inputting argon gas, a sintered body may be formed by heating the degreased molded body in a temperature range from about 1250° C. to 1350° C. and performing sintering while maintaining the temperature range for a certain period of time.

The molded body may be consolidated by compaction and grain growth during the sintering process. It is preferable that sintering is performed in the above-mentioned temperature range in order to obtain necessary mechanical properties through homogenization of the carbon (C) and the nickel (Ni) in the molded body.

5. Post-Processing Step (S140)

A post-processing step includes all additional processes which are necessary to produce the final product from the sintered body, and the additional processes include processes of sizing a required portion by pressing the sintered body for providing precise dimensions, performing a high frequency heat treatment, or the like, as necessary.

Preferably, the post-processes may include a final step for producing a product, which includes a heat treatment such as carburization, a surface polishing process, or the like.

TABLE 1

| Items | Yield strength(MPa) | Tensile strength(MPa) | Test standard |
|---|---|---|---|
| Casting method in the related art | 390 | 450 | ISO 6892, ISO 2740 |
| An exemplary embodiment of the present invention | 482 | 714 | ISO 6892, MPIF Standard 50 |

Table 1 represents a comparison in terms of strength between a control finger according to an exemplary embodiment of the present invention and a control finger manufactured by a casting method in the related art. As shown in the table, the yield strength and the tensile strength of the control finger manufactured in accordance with the exemplary embodiment of the present invention are measured as 482 MPa and 714 MPa, respectively. The yield strength and the tensile strength are approximately 24% and 59% larger than the yield strength and the tensile strength of the control finger manufactured by the casting method in the related art.

TABLE 2

| Items | Fatigue life (test torque 100.4 Nm) | Breaking torque(Nm) |
|---|---|---|
| Casting method in the related art | 78,000 cycles | 228 to 251 |
| An exemplary embodiment of the present invention | 547,000 cycles | 272 to 310 |

Figure 3:
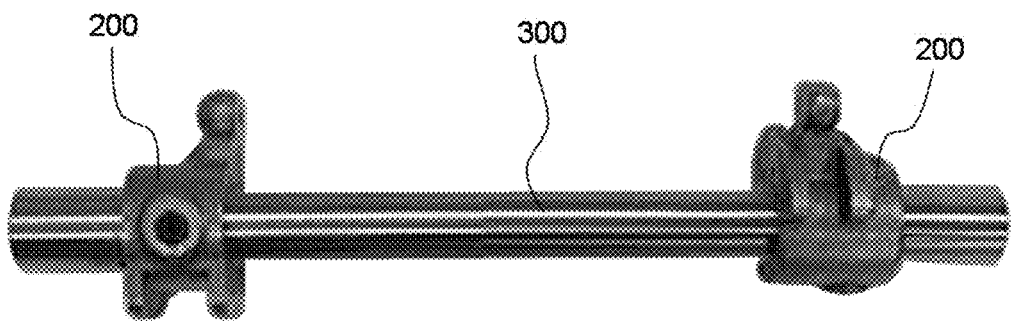
FIG. 3 is an image illustrating the control finger mounted on a shaft.
Figure 4:
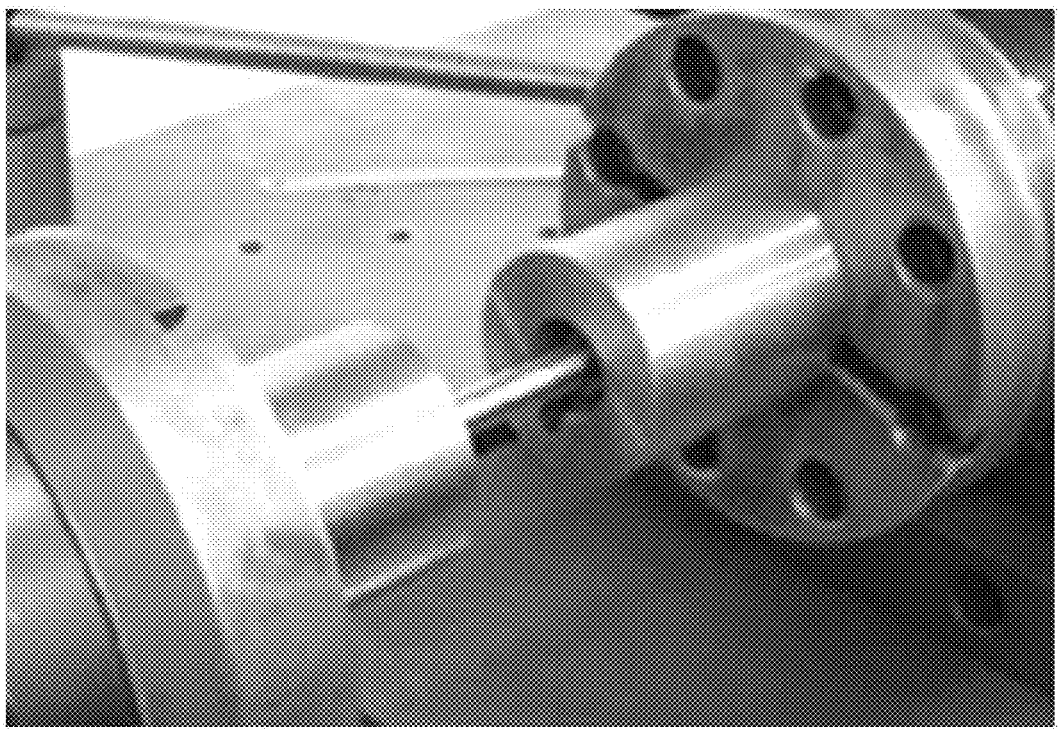
FIG. 4 is an image illustrating the control finger under a twisting test.

Table 2 represents a comparison in terms of fatigue life and breaking torque between a control finger according to an exemplary embodiment of the present invention and a control finger manufactured by a conventional casting method. FIG. 3 is an image illustrating a control finger mounted on a shaft, and FIG. 4 is an image illustrating a control finger under a twisting test.

The fatigue life is measured by applying twisting torque under an actual operating environment, and the breaking torque is measured as a twisting torque when a component is broke due to twisting.

As shown in the table, fatigue life and breaking torque of the control finger manufactured in accordance with the exemplary embodiment of the present invention are 547,000 cycles and 272-310 Nm, and the control finger according to the present invention has an improved fatigue life compared to the control finger manufactured by the conventional casting method.

As described above, the present invention has an effect in that the cost is reduced about 50% by manufacturing the control finger that has been manufactured by the conventional casting method, by using the metal powder injection molding without post-processing. In addition, the present invention may provide the control finger having increased strength by optimizing power compositions and processing conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a control finger using metal powder injection molding, comprising:
    mixing a metal power and a binder to obtain a base material for injection molding;
    forming a molded body by injecting the base material for injection molding into a mold formed in a shape of the control finger, using a nozzle;
    degreasing the molded body;
    sintering the degreased molded body to form a sintered body; and
    post-processing the sintered body
    wherein the metal powder includes about 0.4 to 0.6 wt % of carbon, about 1.5 to 2.5 wt % of nickel and the remaining weight percent of iron.

2. The method of claim 1, wherein the obtaining of the base material for injection molding is performed by mixing about 85 to 90 wt % of the metal powder and about 10 to 15 wt % of the binder.

3. The method of claim 1, wherein the forming of the molded body is performed by using the nozzle in a temperature range from about 100 to 200° C.

4. The method of claim 1, wherein the degreasing of the molded body is performed by extracting solvent in a temperature range from about 35° C. to 50° C., using normal hexane solvent, and by performing a thermal decomposition in a temperature range from about 100° C. to 150° C.

5. The method of claim 1, wherein the forming of the sintered body is performed by heating in a temperature range from about 1250° C. to 1350° C.

6. The method of claim 1, wherein the binder is paraffin wax.

7. The method of claim 1, wherein the binder is polyethylene.

8. The method of claim 1 wherein the binder is stearic acid.

9. The method of claim 1, wherein the binder includes at least one of stearic acid, polyethylene and paraffin wax.

* * * * *